US009148943B2

(12) United States Patent
Beliveau et al.

(10) Patent No.: US 9,148,943 B2
(45) Date of Patent: Sep. 29, 2015

(54) THERMAL TORCH LEAD LINE CONNECTION DEVICES AND RELATED SYSTEMS AND METHODS

(71) Applicant: Hypertherm, Inc., Hanover, NH (US)

(72) Inventors: Jeremy Beliveau, Enfield, NH (US); Jonathan Mather, Grafton, NH (US)

(73) Assignee: Hypertherm, Inc., Hanover, NH (US)

( * ) Notice: Subject to any disclaimer, the term of this patent is extended or adjusted under 35 U.S.C. 154(b) by 391 days.

(21) Appl. No.: 13/736,654

(22) Filed: Jan. 8, 2013

(65) Prior Publication Data

US 2014/0110382 A1 Apr. 24, 2014

Related U.S. Application Data

(60) Provisional application No. 61/716,193, filed on Oct. 19, 2012.

(51) Int. Cl.

| | |
|---|---|
| ***B23K 10/00*** | (2006.01) |
| ***H05H 1/34*** | (2006.01) |
| ***H01R 13/52*** | (2006.01) |
| ***H01R 43/26*** | (2006.01) |
| ***H05H 1/28*** | (2006.01) |

(52) U.S. Cl.
CPC ............. *H05H 1/34* (2013.01); *H01R 13/5205* (2013.01); *H01R 43/26* (2013.01); *H05H 1/28* (2013.01); *Y10T 29/49117* (2015.01)

(58) Field of Classification Search
CPC ........... H05H 1/34; H05H 1/28; H01R 43/26; H01R 13/5205
USPC ............. 219/121.48, 121.49, 121.39, 121.45, 219/121.54, 121.55, 75
See application file for complete search history.

(56) References Cited

U.S. PATENT DOCUMENTS

| | | | |
|---|---|---|---|
| 3,544,758 | A | 12/1970 | Unitec |
| 3,996,546 | A | 12/1976 | Hugly |
| 4,131,805 | A | 12/1978 | Austin et al. |
| 4,270,824 | A | 6/1981 | Erickson |
| 4,600,824 | A | 7/1986 | Moerke |
| 5,074,802 | A | 12/1991 | Gratziani et al. |

(Continued)

FOREIGN PATENT DOCUMENTS

| | | |
|---|---|---|
| EP | 0315924 | 5/1989 |
| WO | 9104122 | 4/1991 |

(Continued)

*Primary Examiner* — Mark Paschall
(74) *Attorney, Agent, or Firm* — Proskauer Rose LLP

(57) ABSTRACT

In some aspects, lead connector assemblies for plasma arc torches for providing electrical and fluid connections can include male and female connectors. The female connector can include a current conductive member, a sealing member, clearance region, binding region, and a locking ring having a locking flange. The male connector can include a body defining an internal fluid passage, an electrical contact region, a sealing region, a locking trough, and a driving lip. The male connector, when assembled to the female connector, typically has an engaged configuration and a disengaged configuration. In the engaged configuration, the male connector is locked within the female connector, the electrical contact region forms an electrical connection with the current conducting member, the sealing region forms a seal against the sealing member, the locking trough receives the locking flange, and the locking flange is positioned between the driving lip and the binding region.

5 Claims, 6 Drawing Sheets

(56) References Cited

U.S. PATENT DOCUMENTS

| | | | | |
|---|---|---|---|---|
| 5,208,436 | A | 5/1993 | Blankenship | |
| 5,624,586 | A | 4/1997 | Sobr et al. | |
| 6,049,142 | A | 4/2000 | Wakefield | |
| 6,472,631 | B1 | 10/2002 | Eickhoff et al. | |
| 6,683,273 | B2 | 1/2004 | Conway et al. | |
| 6,699,052 | B1 | 3/2004 | Poran | |
| 6,713,711 | B2 | 3/2004 | Conway et al. | |
| 6,720,527 | B2 | 4/2004 | Gadamus et al. | |
| 6,852,943 | B2 | 2/2005 | Eickhoff et al. | |
| 7,176,404 | B2 | 2/2007 | Herres | |
| 7,288,740 | B2 | 10/2007 | Radtke | |
| 2002/0190042 | A1 | 12/2002 | Gadamus et al. | |
| 2003/0213784 | A1* | 11/2003 | MacKenzie et al. | 219/121.53 |
| 2009/0212027 | A1 | 8/2009 | Borowy et al. | |
| 2009/0215302 | A1* | 8/2009 | Roberts | 439/350 |
| 2011/0247999 | A1 | 10/2011 | Ihde et al. | |
| 2015/0173165 | A1* | 6/2015 | Namburu et al. | 219/121.49 |

FOREIGN PATENT DOCUMENTS

| | | |
|---|---|---|
| WO | 2006/060268 | 6/2006 |
| WO | 2010135752 | 12/2010 |

* cited by examiner

THERMAL TORCH LEAD LINE CONNECTION DEVICES AND RELATED SYSTEMS AND METHODS

TECHNICAL FIELD

The technology relates generally to thermal cutting torches (e.g., plasma arc torches), and more specifically to thermal torch lead line connection devices and related systems and methods.

BACKGROUND

Some conventional torch systems (e.g., plasma torch systems) can include one or more electrical and gas delivery lead lines having torch lead connectors to transfer electrical current, seal liquid/gas, and/or provide a securing method between a torch and a power supply. Some conventional torch connections utilize threaded connections to achieve these connections. In some cases, some plasma torch power supplies have multiple threaded connections to fluidly and electrically connect a torch to the power supply.

SUMMARY

In some aspects, a lead connector assembly for a plasma arc torch for providing electrical and fluid connections between a male lead connector and a female lead connector disposed in association with a plasma arc torch power supply can include a male lead connector, wherein the female lead connector comprises a current conductive member, a sealing member, clearance region, binding region, and a locking ring having a locking flange. The male lead connector can include a body defining an internal fluid passage, an electrical contact region, a sealing region, a locking trough, and a driving lip. The male lead connector, when assembled to the female lead connector, has an engaged configuration and a disengaged configuration. In the engaged configuration, the electrical contact region forms an electrical connection with the current conducting member, the sealing region forms a seal against the sealing member, the locking trough receives the locking flange, and the locking flange is positioned between the driving lip and the binding region, and, as a result of the engaged configuration, the male lead connector is locked within the female lead connector.

In some embodiments, in the disengaged configuration, the locking flange is located substantially within the clearance region, the locking flange is substantially outside of the locking trough, and both the binding region and the driving lip are arranged one side of the locking flange, and, as a result of the disengaged configuration, the male lead connector can be removed from the female lead connector.

In some embodiments, in the disengaged configuration, the electrical contact region is substantially in contact with the current conductive member. In some cases, in the disengaged configuration, the sealing member does not form a seal with the sealing region.

In some examples, the fluid can include a gas and/or a liquid.

In some aspects, a plasma arc torch having at least two fluid lines can include: a torch body defining a first fluid passage and a second fluid passage, the torch body having a proximal end and a distal end; a torch consumable mounting location disposed at the distal end of the torch body; a lead mounting location disposed at the proximal end; a first extension tube coupled to the first fluid passage; a second extension tube coupled to the second fluid passage; a first connector coupled to the first extension tube, the first connector having an engaged configuration and a disengaged configuration with a corresponding first lead connector; and a second connector coupled to the second extension tube, the second connector having an engaged configuration and a disengaged configuration with a corresponding second lead connector, In the engaged configuration of the first connector, the first connector is retained within the first lead connector by a locking flange of a locking ring of the first lead connector disposed along a driving lip of the first connector, the locking flange retaining the first connector by a binding region of the first lead connector, and, in the engaged configuration, the first connector provides electrical communication and fluid sealing between the first connector and the first lead connector; in the disengaged configuration of the first connector, the locking flange is offset from the binding region of the first connector and is configured to be displaced by the driving lip of the first connector; in the engaged configuration of the second connector, the second connector is retained within the second lead connector by a locking flange of a locking ring of the second lead connector disposed along a driving lip of the second connector, the locking flange retaining the second connector by a binding region of the second lead connector, and, in the engaged configuration, the second lead connector provides electrical communication and fluid sealing between the second connector and the second lead connector; and in the disengaged configuration of the second connector, the locking flange is offset from the binding region of the first connector and is configured to be displaced by the driving lip of the second connector.

In some embodiments, in the disengaged configuration of the first connector, the electrical communication is maintained by the first connector. In some cases, in the disengaged configuration of the first connector, the first connector does not provide fluid sealing.

In some embodiments, the first connector is configured to provide coolant and plasma cutting current to the plasma arc torch.

In some embodiments, the second connector is configured to provide shield gas and starting current to the plasma arc torch.

In some aspects, a method for electrically and fluidly coupling two conduits that deliver electricity and a fluid from a plasma arc torch control unit to a plasma arc torch can include translating a male connector defining a first conduit toward a female connector defining a second conduit in an assembly direction; engaging an electrical contact connection between the male connector and the female connector; mechanically coupling the male and female connectors to create a sealed fluid flow path that limits fluid from exiting a joint between the male and female connectors; and cooling the electrical contact connection by a fluid flowing through the conduit.

In some embodiments, the method also includes translating a locking ring of the female connector and translating the male connector away from the female connector in an unassembled direction.

In some embodiments, mechanically coupling the male and female connectors comprises translating a locking ring of the female connector.

In some aspects, a lead connector for a plasma arc torch for providing an electrical and fluid connection with an adjoining female connector can include a electrically conductive body defining: a fluid passage means configured to receive a fluid from the female connector; a means for establishing an electrical connection with a current conducting member disposed within the female connector; a means for establishing a fluid connection with a fluid passage of the female connector; and a means for being retained within the female connector by a locking collar disposed within the female connector.

For example, in some embodiments, the means for being retained within the female connector can include a means for being retained by a locking flange of a displaceable locking ring.

In some aspects, a method for establishing an electrical connection and a fluid connection between a plasma arc torch and a plasma arc torch control unit, the plasma arc torch control unit having a fluid conduit and the plasma arc torch having a fluid delivery line for providing a fluid to the plasma arc torch can include inserting a first connector component into a receptacle of a second connector component, the first connector component being inserted a first distance, which is sufficient so that a first substantially cylindrical portion of the first connector component contacts a current conducting member of the second connector component placing the first and second connector components in electrical communication with one another; inserting the first connector component into the receptacle an additional, second distance so that a second substantially cylindrical portion of the first connector component contacts a sealing element of the second connector component; and engaging a resilient, deflectable locking flange of a locking ring in a recess of the first connector component to limit movement of the first connector component away from the second connector component, wherein in an engaged configuration, the first and second connector components are fluidly and electrically connected to one another and together define a fluid flow path for delivering the fluid to the plasma arc torch.

In some embodiments, the method further includes disengaging the locking flange from the recess by pushing the locking ring into the second connector component so that the locking flange is arranged in a clearance region of the second connector component. In some cases, the method also includes moving the first connector component away from the second connector component to separate the first and second connector components. In some cases, as the first connector component moves out of the second connector region, a driving lip of the first connector component deflects the locking flange away from the recess and into the clearance region.

In some embodiments, the second substantially cylindrical portion has an average width that is larger than an average width of the first substantially cylindrical portion.

In some embodiments, the sealing element in contact with the second substantially cylindrical portion creates a fluid seal that limits fluid from escaping the fluid flow path.

In some embodiments, the method also includes cooling a region where the first substantially cylindrical portion contacts the current conducting member by a fluid flowing through the fluid flow path.

In some aspects, the lead connectors described herein having push-to-connect style fittings (e.g., quick-disconnect style fittings) can be used to create an easier to use torch connection with a power supply than some other torch lead connectors, such as torch connectors that utilize threaded connections. For example, threaded connections typically require tools (e.g., wrenches) to tighten, seal, and secure the torch connector. Additionally, in some cases, threaded connections can require the use of two wrenches. Such threaded connectors can cause twisting, bending, or kinking of tubes (all of which can cause reduced flow problems (e.g., no flow) through the lead lines). Also, cross threading of the threaded connections can cause leaks and can permanently damage the connection.

Threaded connections can also have metric vs. SAE size concerns when used in a global market, for example, as a result of the different sizing standards used around the world. In some cases, threaded connections can become damaged (e.g., rounded off), making proper tightening or removal difficult or impossible. Also, time required to find the correct tool and to make the connection can be lengthy when using such threaded connections. Additionally, when using a threaded connection, there is typically no visual indication that the joint is fully secured. Further, a threaded connection typically cannot be rebuilt or repaired in an efficient or cost effective manner.

Whereas torch lead connectors as described herein having quick-disconnect style fittings typically do not require the use of tools to connect or disconnect the torch lead to the power supply. In some cases, the torch lead connectors described herein can enable damaged torches to be replaced with less system downtime than some torches using other types of connection techniques (e.g., threaded connections).

Using the lead connectors described herein having quick release style connection devices, some or all of the problems associated with using threaded connections as described above can be prevented.

In some aspects, the lead connectors described herein can help to limit (e.g., prevent) improper or insufficient electrical connection between the torch lead and the torch power supply. For example, in some embodiments, the combination of a current carrying multiple contact band (e.g., a Louvertac™ band) in conjunction with a push to connect style fitting can create a fluid carrying electrical connection that can be quickly and easily connected and disconnected without the use of tools. In some cases, the arrangement of the current carrying multiple contact band can help to establish an electrical current between the torch lead and the torch power supply before a complete mechanical connection is made. Establishing a connection in this manner can help to limit (e.g., prevent) electrical arcing that could result from an improper connection, which can occur with some other types of lead connectors when a mechanical connection is made without first establishing a sufficient electrical connection.

In some aspects, the torch lead connectors described herein can help to alert the user of incomplete or improper connections with the power supply. For example, some of the lead connectors described herein having multiple regions that each have different diameters or cross drilled holes positioned along regions of the torch lead connector can cause leaks when the connection is not fully connected in order to aid in the proper insertion and removal of the two components of the connector. Alerting the user that the torch lead is improperly connected to the power supply can help limit (e.g., prevent) poor or unsafe torch operation that could result from the torch lead not being fully connected to the power supply.

3A to a distance so that the locking flange has rebounded into a locking trough of the male component.

Figure 3A:
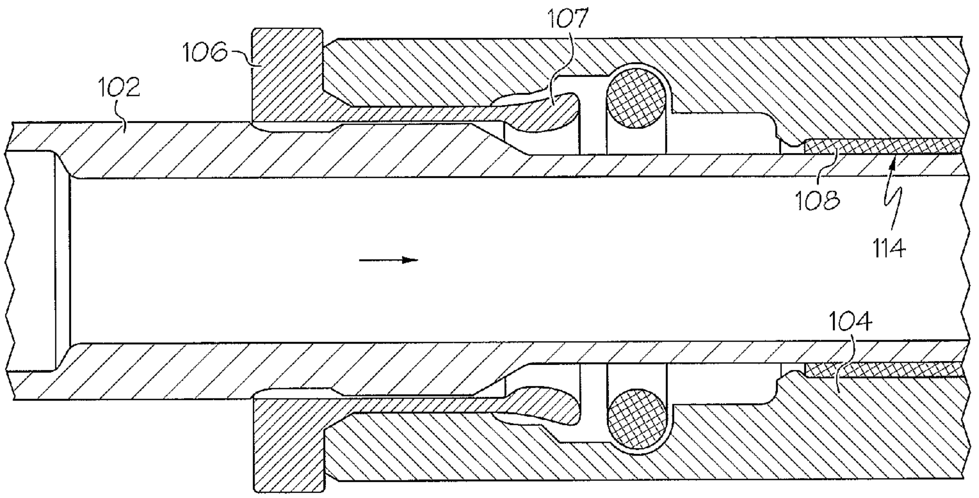
FIG. 3A is a cross-sectional side view of a male component of the lead connector of FIG. 1 being inserted into a female component of the lead connector of FIG. 1.
Figure 3B:
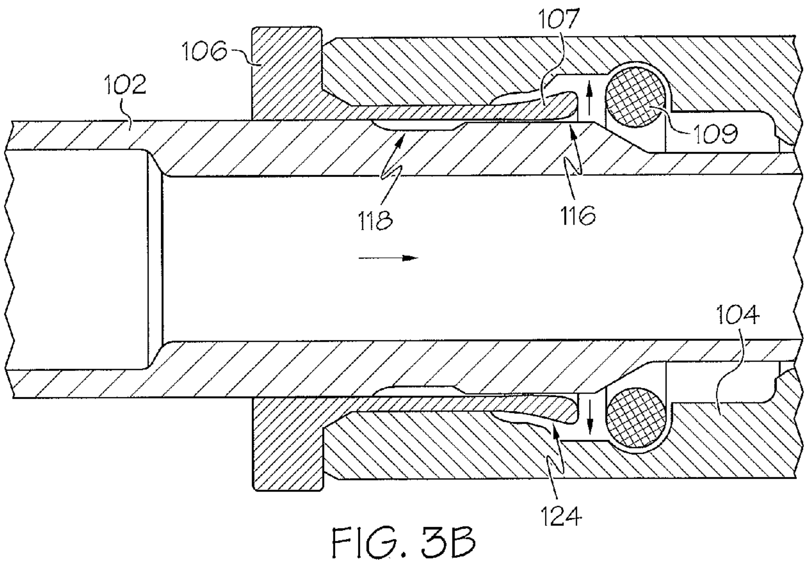
FIG. 3B is a cross-sectional side view of the male component of FIG. 3A inserted into the female component of FIG. 3A to a distance so that male component deflects a locking flange of a locking ring.
Figure 3C:
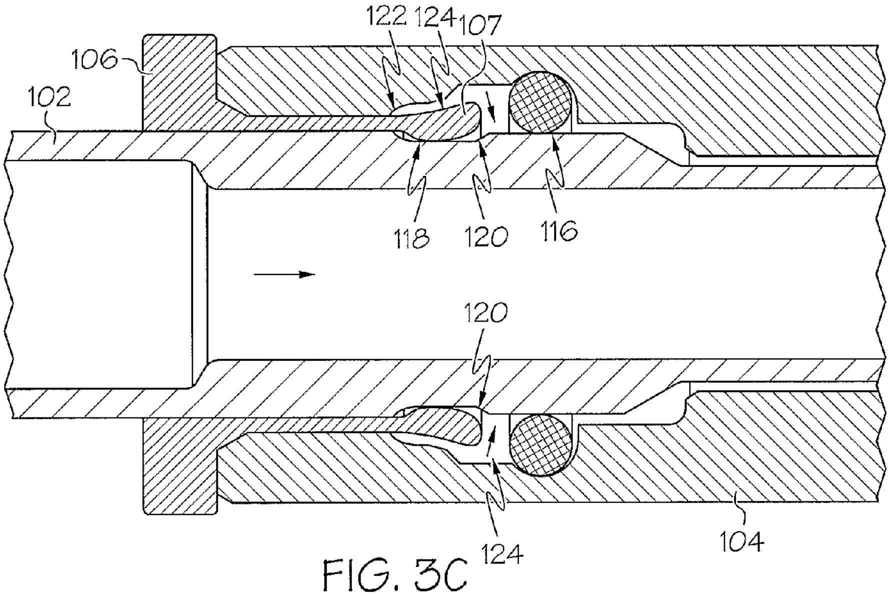
FIG. 3C is a cross-sectional side view of the male component of FIG. 3A inserted into the female component of FIG.
Figure 3D:
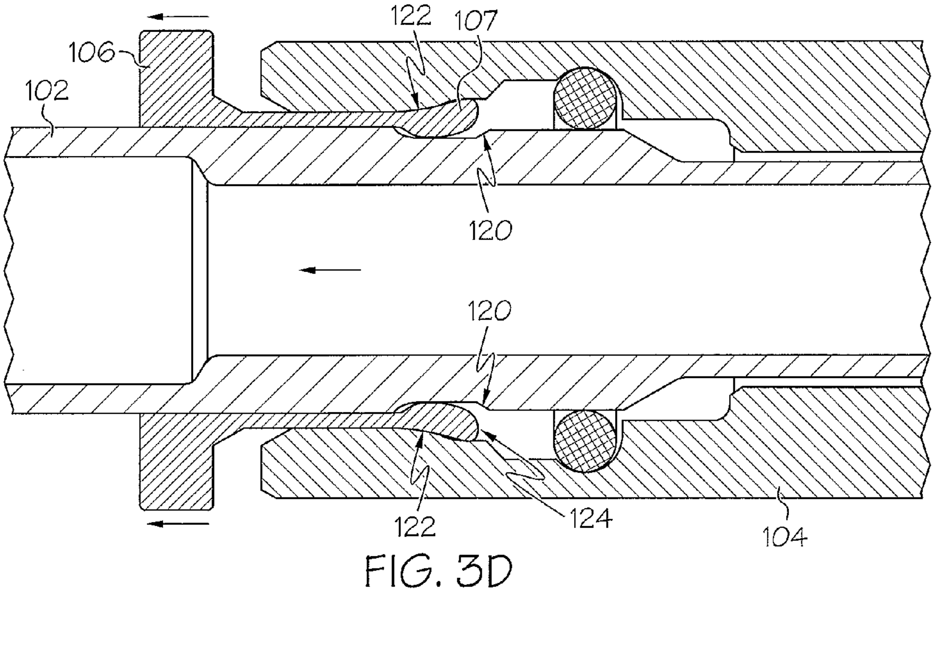

FIG. 3D is a cross-sectional side view of the male component of FIG. 3A inserted into the female component of FIG. 3A in an engaged connected configuration.

Figure 4:
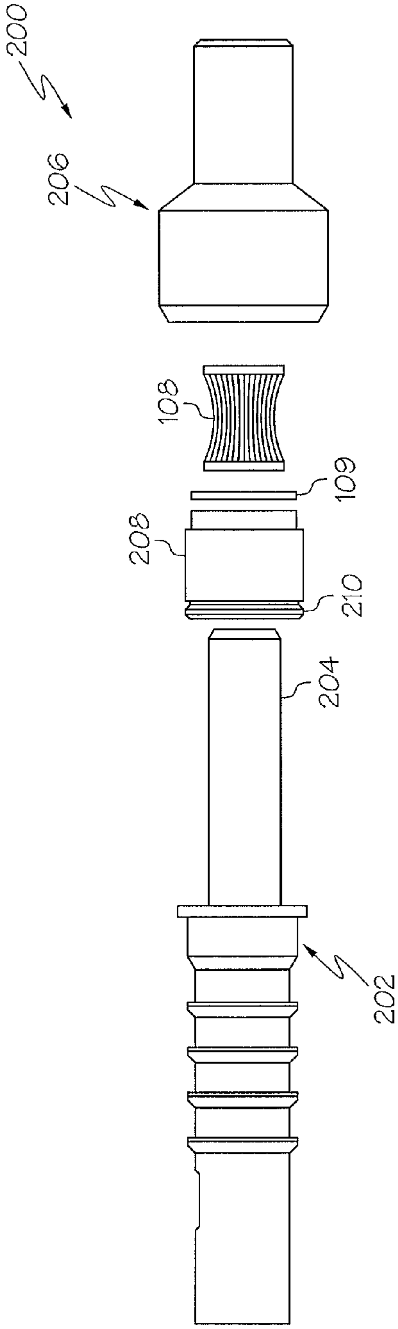

FIG. 4 is an exploded side view of another exemplary plasma arc torch gas delivery lead connector having a push-to-connect style fitting.

Figure 5:
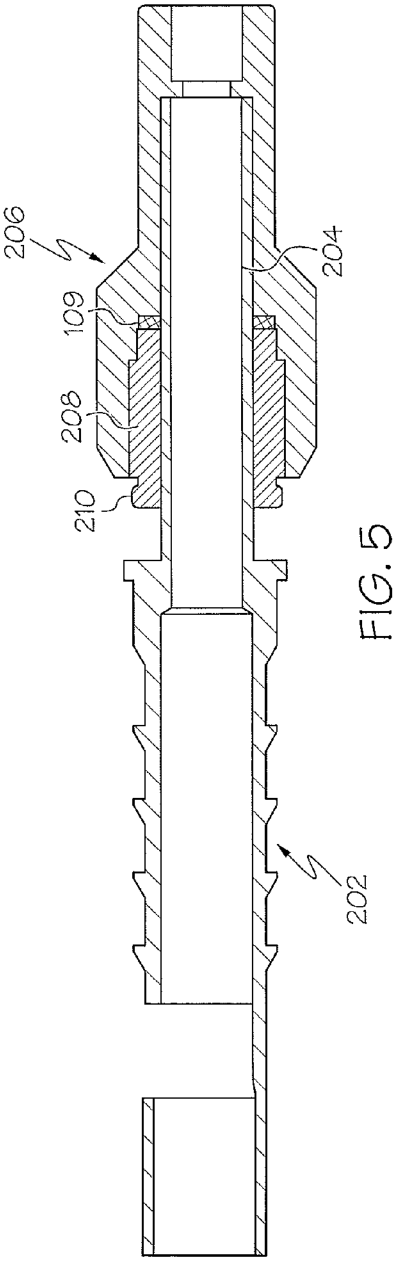

FIG. 5 is a cross-sectional side view of the lead connector of FIG. 4 in an engaged connected state.

Figure 6:
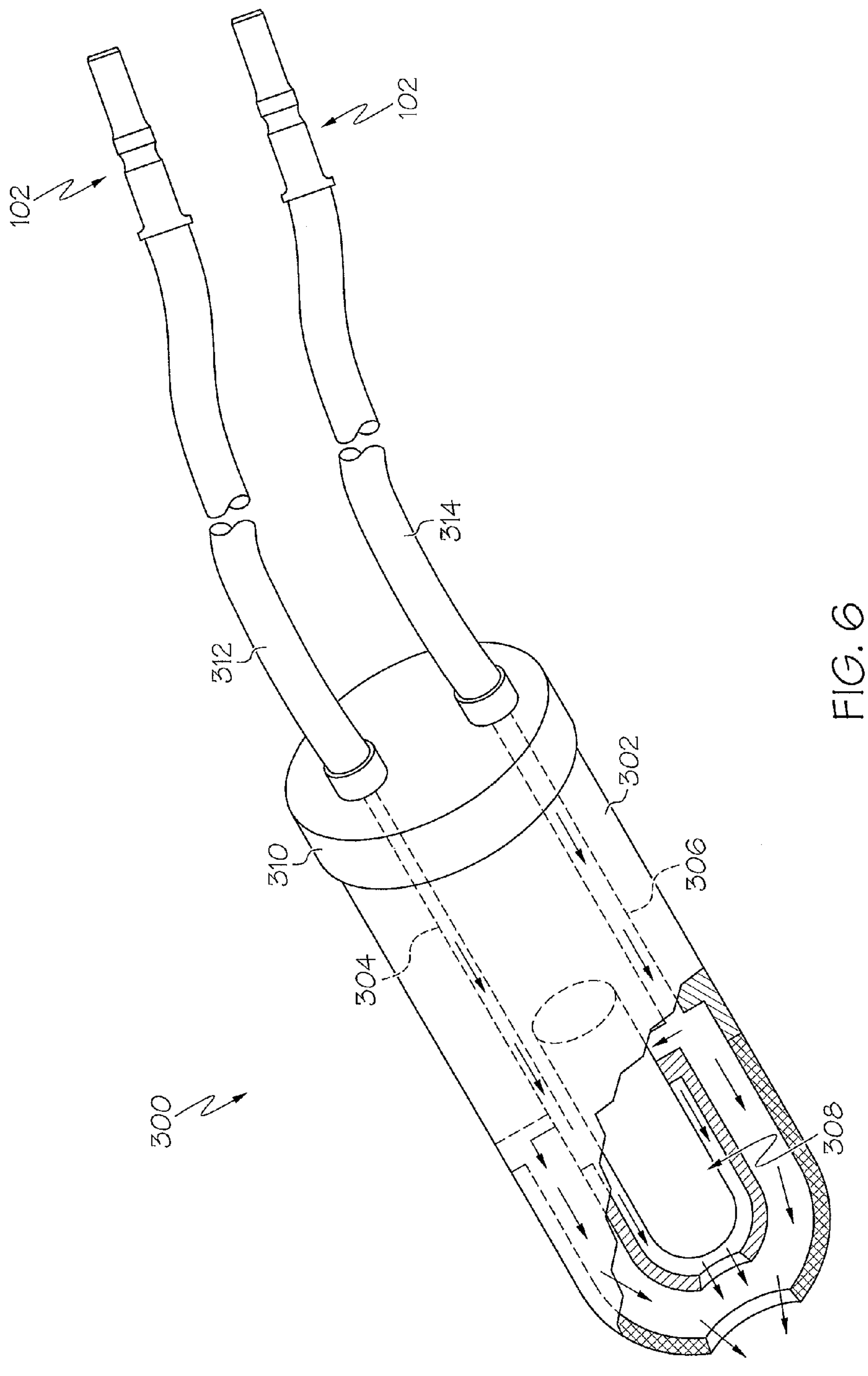

FIG. 6 is a perspective view of a plasma arc torch having multiple gas delivery lead lines having lead connectors with push-to-connect style fittings.

Figure 7:
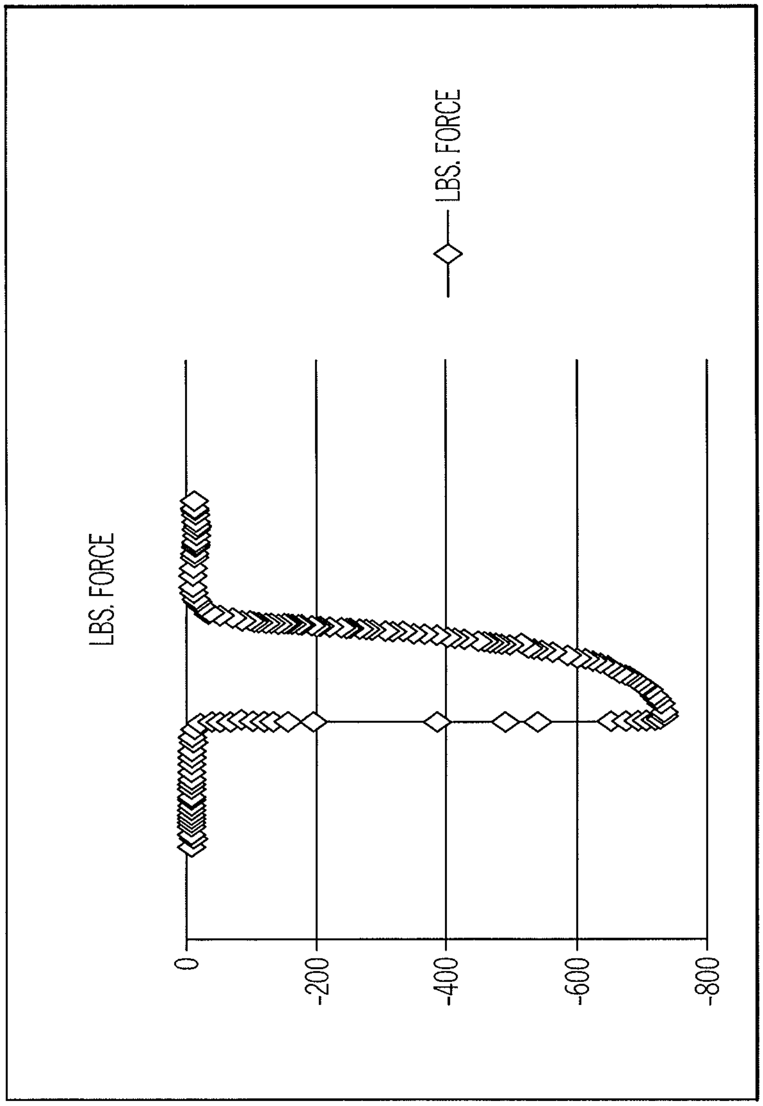

FIG. 7 is graph depicting test results observed when an example lead connector underwent tensile testing.

DETAILED DESCRIPTION

In some aspects, thermal torch gas delivery lead lines having push-to-connect style connectors (e.g., as opposed to threaded or other more cumbersome style connectors) to connect a thermal torch to a power supply can result in a torch system that is easier to setup and use and, in some cases, more efficient and less expensive to maintain.

Figure 1:
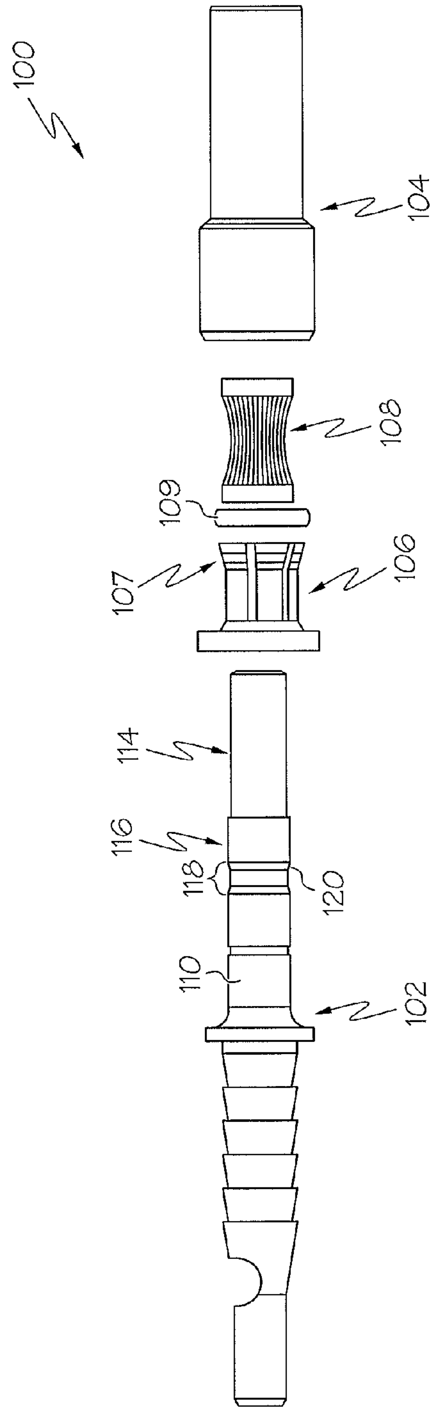
FIG. 1 is an exploded side view of an exemplary plasma arc torch gas delivery lead connector having a push-to-connect style fitting.

Referring to FIG. 1, in some embodiments, a torch lead connector 100 includes a first component (e.g., a male component) 102 that can be received and secured within a second component (e.g., a female component) 104. In some cases, the male component 102 can be connected (e.g., detachably connected) to a plasma arc gas delivery lead line connected to a plasma arc torch. In some cases, the female component 104 can be connected (e.g., detachably connected) to a plasma arc torch power supply control unit in order to provide electrical power and/or gas (e.g., cutting gas or shield gas) to the plasma arc torch.

Figure 2:
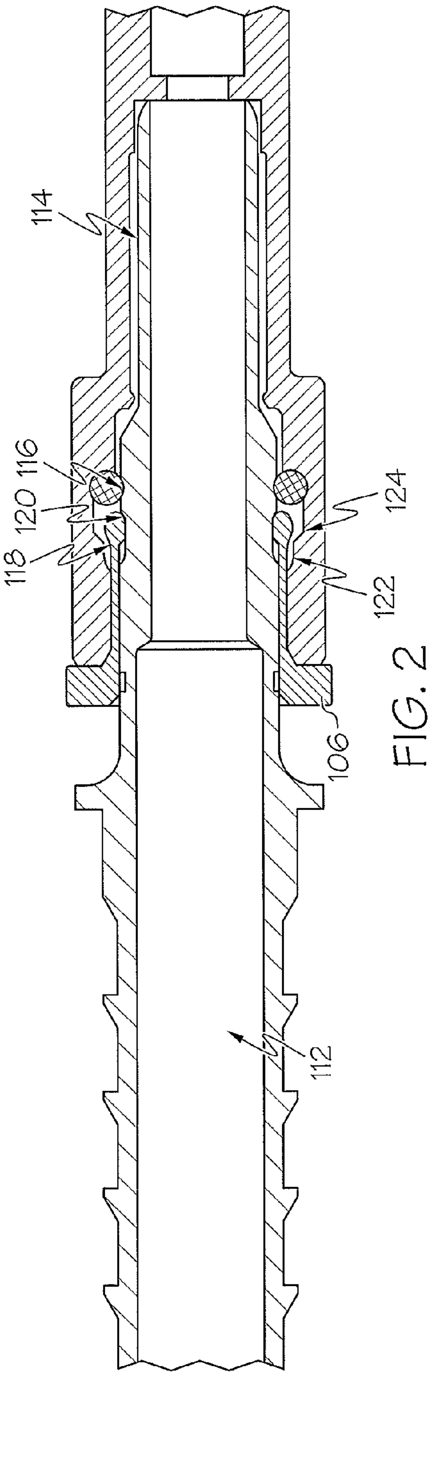
FIG. 2 is a cross-sectional side view of the lead connector of FIG. 1 in a disengaged connected state.

The lead connector assembly 100 includes a securing device (e.g., a locking ring) 106 that can move (e.g., translate) within the female component 104 to engage and disengage the male component 102 within the female component 104, for example to secure a torch to a power supply. As discussed below, the locking ring 106 has features (e.g., a resilient locking flange 107) that can interface with a feature of the male component (e.g., a locking trough of the male component) to retain the male component within the female component. In some embodiments, the lead connector 100 also includes a current conducting member 108, such as a multiple point current conducting device (e.g., a Louvertac™ band (e.g., a 110 Amp Louvertac™ band)) to transfer the torch current (e.g., pilot current or cutting current) between the male component and the female component. Additionally, the lead connector 100 typically includes a sealing member (e.g., an o-ring type sealing member) 109 that is disposed within the female component 104. As illustrated in FIG. 2, the sealing member 109 can be positioned within the female component 104 so that when male component 102 is connected to the female component 104, the sealing member 109 can limit (e.g., prevent) fluid from being expelled from the lead connector 100.

Referring to FIGS. 1 and 2, in some embodiments, the male component 102 is formed of a body (e.g., a substantially cylindrical member) 110 defining an internal fluid passageway 112 therethrough. The fluid passageway 112 is configured to receive a fluid (e.g., a gas (e.g., a plasma cutting gas or a shield gas)) from the torch power supply and deliver the fluid to the gas delivery lead line (and then onto the torch).

The body 110 also defines various different outer shapes and/or features (e.g., diameters) to interface with various features of the female component 104 and the locking ring 106. For example, as illustrated, the body 110 can define an electrical contact region 114, which as illustrated, can have a width (e.g., a diameter) that is smaller than other regions of the body 110 so that it can be received within a current conducting member 108 disposed within the female component 104. In some embodiments, the electrical contact region 114 is located at an end of the male component 104 so that it can have a reduced diameter (i.e., relative to the other regions of the male component). As illustrated in the example shown in FIG. 2, having a reduced diameter can aid in locating an electrical interface region (e.g., the location where the electrical contact region 114 interfaces with the current conducting member 108 disposed within the female component 104) closer to the fluid flow passage 112. In some embodiments, locating the electrical interface region closer to the fluid flow passage 112 can help to cool electrical interface region by a fluid (e.g., gas) flowing through the fluid flow passageway (e.g., fluid flow path).

A sealing region 116 can be disposed generally adjacent to the electrical contact region 114 along the body 110. As illustrated, the sealing region 116 can define a width (e.g., a diameter) that is greater than the diameter than the electrical contact region 114. During use, the sealing region 116 can be disposed along a sealing member 109 to limit fluid from being expelled from the lead connector connection.

The body 110 further defines a locking trough 118 that, as discussed below, can interface with a feature or region of the locking ring 106 (e.g., a locking flange 107 of the locking ring) for retaining the male component within the female component. For example, in some embodiments, the locking trough 118 is in the form of a recess formed substantially around the body 110 that is sized and configured to receive at least a portion of the locking flange 107. In some cases, the locking trough 118 has a length (e.g., along an axial direction of the body) so that the locking ring 106 can be moved slightly in and out of the female component 104 while the male component 102 remains generally stationary within the female component 104.

Also for interfacing with the locking ring 106, in some embodiments, the body 110 (e.g., the locking trough 118 of the body 110) defines a locking ring driving surface (e.g., a driving lip) 120. The driving lip 120 is typically arranged so that as an outward force is applied to the male component 102 relative to the female component 104, such as when the male component 102 is pulled from the female component 104, the driving lip 120 interfaces with the locking flange 107 to transfer the outward force to the locking flange 107. Briefly referring to FIG. 3D, as discussed below, when such an outward force is applied, the male component 102 translates outwardly, moving the locking ring 106 via the interface between the driving lip 120 and the locking flange 107 until the locking flange 107 moves and contacts a surface of the female connector (e.g., a binding region 122 of the female component 104) placing the locking ring 106 into an engaged configuration. In the engaged configuration, the locking flange 107 that is substantially forced between the binding region 122 and the driving lip 120 establishes a mechanical connection and limits (e.g., prevents) the male component 102 from being removed from the female component 104.

However, briefly referring to FIG. 3C, when the locking ring 106 is held in a disengaged configuration against the female component 104 so that the locking flange 107 is spaced apart from the binding region 122 and is positioned within a clearance region 124 of the female component 104, if an outward force is applied to the male component 102, the locking flange 107 is generally able to deflect outwardly into the clearance region 124 of the female component 104 (as illustrated in FIG. 3C). That is, a deflecting force generated by the driving lip 120 at the driving lip/locking flange interface can drive the locking flange 107 out of the locking trough 118 and into the clearance region 124 so that the male component 102 can be removed from the female component 104.

Referring back to FIG. 2, as briefly discussed above, the female component 104 defines several surfaces and features by which the female component 104 can interface and engage portions of the male component 102 and the locking ring (e.g., the locking flange 107). For example, the female component 104 defines the clearance region 124 into which the locking flange 107 can be deflected to remove the male component 102 from the female component 104. In some embodiments, the clearance region 124 is in the form of a recess formed along an inner surface of the female component 104 substantially adjacent to the sealing member 109.

The female component 104 also defines the binding region 122 against which the locking flange 107 can be forced to retain the male component 102 within the female component 104 in the engaged configuration. The binding region 122 is typically shaped and configured to contact the locking flange 107 substantially flatly when the locking ring 106 is pulled outwardly from the female component 104. In the example illustrated, the surface of the binding region 122 (and therefore the binding region/locking flange interface in the engaged configuration) is angled outwardly relative to the male component 102 so that when the locking ring 106 is pulled outward, for example when force is applied to the male component 102 and the driving lip 120 forces the locking flange 107 into the binding region 122 as discussed above, the binding region 122 applies a force to the locking flange 107 that is inward axially (relative to the female component) and also inward radially (i.e., towards a central axis of the female component). That is, the binding region 122 can be configured so that as the male component 102 is pulled relative to the female component 104, the locking flange 107 is driven into the locking trough 118 and into driving lip 120. In some cases, the inward forces generated by the binding region 122 strengthen the mechanical joint between the male component 102 and the female component 104.

Using the different interfacing surfaces and features of the male component, female component, and locking ring described herein, the lead connector can be used to quickly and easily electrically and fluidly connect a torch lead line connected to the male component to a torch power supply via the female component. Once connected, gas and electrical power can be provided to the torch from the power supply.

FIGS. 3A-3D illustrate an example connection sequence for securing a male connector (e.g., the male component 102) within a female connector (e.g., the female component 104) using a securing device (e.g., the locking ring 106). Referring specifically to FIG. 3A, the male component can first be inserted into a receptacle opening of the female component. For example, the male component can be inserted into the opening of the locking ring. As illustrated in FIG. 3A, the male component can be inserted a first distance so that a first substantially cylindrical portion of the male component (e.g., the electrical contact region 114) makes contact with the current conducting member (e.g., the current conducting member 108) disposed within the female component. As discussed above, the lead connector can be configured so that an electrical connection is established between the male and female components prior to a sealed fluid connection during the connection sequence in order to limit or prevent inadvertent electrical arcing. That is, in some cases, in the disengaged configuration, the electrical contact region is substantially in contact with the current conductive member.

Referring to FIG. 3B, the male component can be further inserted (e.g., an additional, second distance) into the female component so that a second substantially cylindrical portion of the male component (e.g., the sealing region 116) can approach and make contact with a sealing element (e.g., the sealing member 109) disposed within the female component. Additionally, as illustrated, the second substantially cylindrical portion can contact and deflect the resilient, deflectable portion of the locking ring (e.g., the locking flange 107 of the locking ring 106) into a clearance region (e.g., the clearance region 124) of the female connector. As a result of the locking flange being able to deflect into the clearance region, the larger second cylindrical portion is able to translate further into the female component (i.e., translate beyond the locking flange).

Referring to FIG. 3C, as the male component is pushed further into the female component, the sealing region can contact and form a fluid seal with the sealing element. Also, once the male component reaches a certain distance within the female component, the locking ring can engage the male component. For example, as illustrated, once the male component is inserted far enough into the female component so that a locking trough (e.g., the locking trough 118) reaches the resilient locking flange, the locking flange can rebound inward and seat within the locking trough.

As shown, when the locking ring is depressed into the female component, the connector is in a disengaged configuration. That is, in the disengaged configuration, the locking flange is arranged within the clearance region such that if the male component is pulled from the female component while the locking ring is held against the female component, the locking flange can deflect outwardly away from the male component so that the male component can be removed from the female component. Whereas, in an engaged configuration, the positioning of the locking ring (e.g., the positioning of the locking flange against the binding region 122 and the driving lip 120) limits (e.g., prevents) the male component from being removed from the female component.

For example, referring to FIG. 3D, in an engaged configuration, the locking flange 107 is disposed within the locking trough 118 of the male component and the locking ring 106 is arranged in a position spaced away from the female component 104. In some cases, the male component 102 is pulled slightly away from the female component 104 to place the connector in the engaged configuration. In the engaged configuration, the driving lip 120 of the male component 102 depresses against the locking flange 107 and forces the locking flange 107 against the binding region 122 of the female component 104. Since the locking ring 106 is moved slightly outward away from the female component 104 when in the engaged configuration, the locking flange 107 has no clearance region into which it could deflect so that the male component could be removed. As a result, the male component 102 is substantially secured (e.g., locked) into the female component 104. To remove the male component 102 from the female component 104, the locking ring 106 can be depressed into the female component (i.e., into the disengaged configuration illustrated in FIG. 3C) and the male component can be removed as the locking flange 107 is deflected away from the locking trough 118 into the clearance region 124.

In some aspects, a lead connector for a plasma arc torch for providing an electrical and fluid connection with an adjoining female connector (e.g., a connector disposed on a torch power supply can include an electrically conductive body (e.g., the body 110) that defines a fluid passage means (e.g., the fluid passageway 112) configured to receive a fluid from the female connector, a means for establishing an electrical connection with a current conducting member disposed within the female connector (e.g., the electrical contact region 114); a means for establishing a fluid connection with a fluid passage of the female connector (e.g., the sealing region 116 to interface with the sealing member 109); and a means for being retained within the female connector by a locking collar disposed within the female connector. For example, in some embodiments, the means for being retained within the female connector comprises a means for being retained by a locking flange of a displaceable locking ring (e.g., the locking flange 107 of the locking ring 106). In some cases, means for being retained by a locking flange can include a recess (e.g., the locking trough 118 and/or the driving lip 120) formed along the conductive body to interface with the locking flange.

While the lead connector has been illustrated and described as being a certain type of push-to-connect fittings and components (e.g., the locking ring), other types of fittings can be used. For example, in some embodiments, the lead connector can utilize one or more of other various types of conventional style push-to-connect fittings (e.g., quick disconnect fittings). For example, commercially available quick disconnect fittings, such as cartridge style push-to-connect fittings or similar suitable types of fittings from Legris of Mesa, Ariz., USA; SMC of Noblesville, Ind., USA; or Norgren of Lichfield, Staffordshire, UK can be used.

Referring to FIG. 4, in some embodiments, referring to FIG. 4, another example lead connector 200 includes a male component 202 having an electrical contact region 204 and a female component 206 defining one or more contact surfaces or fluid passageways that are configured to receive and secure the male component 202. Similar to the lead connector 100 described above, the lead connector 200 includes a current conducting member 108 to establish an electrical connection between the female component 206 and male component 202 (e.g., the electrical contact region 204). The lead connector 200 also typically includes a sealing member (e.g., an o-ring style sealing member) 109 that limits (e.g., prevents) fluid passing through the lead connector 200 from inadvertently being expelled from the connection between the male component 202 and the female component 206.

The lead connector 200 also includes a locking device (e.g., a push-to-connect style locking device (e.g., a Legris style connector)) 208 to retain and secure the male component 202 within the female component 206. The locking device 208 includes a biased locking ring 210 that can be depressed and released to place the locking device 208 in an engaged configuration and a disengaged configuration. For example, when the locking ring 210 is released and the locking device 208 is in an engaged configuration, one or more locking fingers can extend inwardly from the locking device 208 to engage an outer region (e.g., a locking region) of the male component 202. When the locking ring 210 is depressed (to a disengaged configuration), the locking fingers can be retracted (e.g., via a spring mechanism) within the locking device 208 to release a retaining force that secures the male component 202 within the female component 206.

While the torch lead connector has generally described as including a male component (e.g., an insertion side of the connector) on the torch lead and a female component (e.g., a receptacle side of the connector) on the torch power supply, other configurations are possible. For example, the design of the torch lead connector can be reversed so that the receptacle side and the insertion side are used on either the torch or lead. For example, in some embodiments, a male end of the connector is arranged on a torch lead and a female end of the connector is arranged on a torch power supply. Alternatively, in some embodiments, a female end of the connector is arranged on a torch lead and a male end of the connector is arranged on a torch power supply.

In some aspects, plasma arc torches can include one or more lead lines that can be connected to a torch power supply using lead connectors as described herein (e.g., the lead connector 100, the lead connector 200, or another similar type of lead connector). Referring to FIG. 6, in some embodiments, a plasma arc torch 300 having a least two fluid lines includes a torch body 302 defining a first fluid passage (e.g., a shield or plasma gas passageway) 304 and a second fluid passage (e.g., a shield or plasma gas passageway) 306. The torch body 302 typically includes a torch consumable mounting location 308 disposed at a distal end of the torch body 302 for installing one or more of various consumables (e.g., an electrode) and a lead mounting location 310 disposed at a proximal end of the torch body 302 by which the torch can be mounted to a movement device (e.g., a gantry).

For delivering fluids (e.g., gases) to the torch for use, the torch body 300 also typically includes a first extension tube (e.g., a first gas delivery lead line) 312 coupled to the first fluid passage 304 and a second extension tube (e.g., a second gas delivery lead line) 314 coupled to the second fluid passage 306.

A first connector (e.g., the male component 102) is coupled to the first extension tube 312 so that the first extension tube 312 can be fluidly connected to a corresponding first lead connector (e.g., the female component 104) arranged on a torch power supply. A second connector (e.g., a second male component 102) is coupled to the second extension tube 314 so that the second extension tube 314 can be fluidly connected to a corresponding second lead connector (e.g., a second female component 104) arranged on a torch power supply. As discussed above, the respective male components 102 and the respective female components 104 can be connected to one another between an engaged configuration and a disengaged configuration using a locking device (e.g., the locking ring 106). The extension tubes 312, 314 can be used to deliver various fluids and electrical power to operate various aspects of the torch. For example, in some embodiments, the first connector is configured to provide coolant and plasma cutting current to the plasma arc torch. In some embodiments, the second connector is configured to provide shield gas and starting current to the plasma arc torch.

As discussed above, the torch lead connectors can be configured so that, in the disengaged configuration of the first or second connector, the electrical communication is maintained by the respective connector. That is, in some cases, the torch is placed in electrical communication with the power supply even if the lead connectors are not sufficiently connected to establish a mechanical or fluid connection. Further, in some embodiments, in the disengaged configuration of the first connector, the first connector does not provide fluid sealing.

The lead connector components described above (e.g., the male component, the female component, and the locking device (e.g., locking ring) can each be formed of any of various structurally and chemically suitable materials. For example, the lead connector components can be made from one or more plastic materials, one or more metal materials, one or more composite materials, or any of various suitable combinations of materials. In some embodiments, at least a portion of the components is made from electrically conductive materials to place the male component in electrical communication with the female component. In examples illustrated and discussed herein, the male and female components are typically made from a metal material, such as brass. The current conducting member can be made from any of various types of electrically conductive materials. For example, the current conducting member is typically formed of copper (e.g., beryllium copper) and can include metal plating (e.g., silver plating) along electrical contact surfaces.

EXAMPLES

Some testing of the torch lead connectors described herein has been performed.

Connection Tensile Load Failure Testing:

An example test sample was prepared including a torch lead connector attached to a cable, and the sample was pull tested to assess the tensile strength of the quick disconnect fitting. In particular, an example torch lead connector similar to the lead connector 100 described above was attached to a 6 awg power cable (via the male connector) and connected so that the lead connector is placed in an engaged configuration. Once connected and engaged, a tensile force was applied to the torch lead connector (e.g., via the attached power cable) using a Promess press. As depicted in FIG. 7, the sample was found to withstand about 740 lbs of force before failing. However, even at the 740 lbs of force, the cable failed while the torch lead connector connection was found to be relatively unharmed and appeared to function properly.

Connection Tensile Load Fatigue Cycling:

Using an air cylinder, a sample torch lead connector in an engaged configuration was cycled through 1 million complete strokes of 100 lbs of force applied to the connection in each axial direction. The cycling test is generally intended to test the locking feature under the load of the lead connector in a track cycling back and forth. The cycling test also stressed an O-ring connection disposed within the lead connector. A wax impregnated O-ring was found to provide the longest life with connections not found to leak until after 1,000,000 complete cycles.

Electrical Current Testing:

Using a test fixture, a sample torch lead connector in an engaged configuration was cycled at 400 A under minimal air cooling for 50 hours with no sign of immediate failure. During typical use, the lead connector connection is expected to only carry about 200 A of electrical current or less using cooling (e.g., direct liquid cooling).

The terminology used herein is for the purpose of describing particular embodiments and is not intended to be limiting of the systems and methods described. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

While the systems and methods described herein have been particularly shown and described above with reference to exemplary embodiments thereof, it will be understood by those of ordinary skill in the art, that various changes in form and detail can be made without departing from the spirit and scope of the systems and methods described and defined by the following claims. Therefore, other embodiments are within the scope of the following claims.

What is claimed:

1. A lead connector assembly for a plasma arc torch for providing electrical and fluid connections between a male lead connector and a female lead connector disposed in association with a plasma arc torch power supply, wherein the female lead connector comprises a current conductive member, a sealing member, clearance region, binding region, and a locking ring having a locking flange, the male lead connector comprising:

a body defining an internal fluid passage, an electrical contact region, a sealing region, a locking trough, and a driving lip, the male lead connector, when assembled to the female lead connector, having an engaged configuration and a disengaged configuration, wherein, in the engaged configuration, the electrical contact region forms an electrical connection with the current conducting member, the sealing region forms a seal against the sealing member, the locking trough receives the locking flange, and the locking flange is positioned between the driving lip and the binding region, and, as a result of the engaged configuration, the male lead connector is locked within the female lead connector.

2. The lead connector assembly of claim 1, wherein, in the disengaged configuration, the locking flange is located substantially within the clearance region, the locking flange is substantially outside of the locking trough, and both the binding region and the driving lip are arranged one side of the locking flange, and, as a result of the disengaged configuration, the male lead connector can be removed from the female lead connector.

3. The lead connector assembly of claim 1, wherein in the disengaged configuration, the electrical contact region is substantially in contact with the current conductive member.

4. The lead connector assembly of claim 3, wherein in the disengaged configuration, the sealing member does not form a seal with the sealing region.

5. The lead connector assembly of claim 1, wherein the fluid includes a gas and/or a liquid.

* * * * *